US007720571B2

(12) United States Patent
Ishihara et al.

(10) Patent No.: US 7,720,571 B2
(45) Date of Patent: May 18, 2010

(54) PROCESS EXECUTION APPARATUS, PROCESS EXECUTION METHOD AND PROCESS EXECUTION PROGRAM

(75) Inventors: Atsushi Ishihara, Tokyo (JP); Tomohiro Yamada, Kanagawa (JP); Nobuhiko Ohguchi, Tokyo (JP); Yoshihiro Chosokabe, Nagano (JP)

(73) Assignee: Sony Corporation, Tokyo (JP)

( * ) Notice: Subject to any disclaimer, the term of this patent is extended or adjusted under 35 U.S.C. 154(b) by 754 days.

(21) Appl. No.: 11/429,878

(22) Filed: May 8, 2006

(65) Prior Publication Data

US 2006/0287770 A1 Dec. 21, 2006

(30) Foreign Application Priority Data

May 9, 2005 (JP) ............................ 2005-136743

(51) Int. Cl.
*A63H 33/00* (2006.01)
*G06F 19/00* (2006.01)
*A63H 17/00* (2006.01)
*B62D 11/02* (2006.01)

(52) U.S. Cl. ...................... 700/245; 700/250; 700/257; 700/258; 446/3; 446/270; 446/297; 446/397; 446/431

(58) Field of Classification Search ................. 700/245; 180/6.2, 6.5, 6.21, 6.48, 21, 218; 280/205–208, 280/210–211; 446/3, 71, 268, 397, 431
See application file for complete search history.

(56) References Cited

U.S. PATENT DOCUMENTS 6,253,058 B1 * 6/2001 Murasaki et al. ............ 434/308
6,289,265 B1 * 9/2001 Takenaka et al. ............ 700/245
6,354,842 B1 * 3/2002 Frei ........................... 434/365
6,369,794 B1 4/2002 Sakurai et al.
6,375,572 B1 * 4/2002 Masuyama et al. ............ 463/43
2002/0077028 A1 * 6/2002 Nishimoto .................. 446/484
2003/0069669 A1 * 4/2003 Yamaura .................... 700/245
2004/0153211 A1 * 8/2004 Kamoto et al. ............. 700/245

FOREIGN PATENT DOCUMENTS

JP 04-237319 A 8/1992
JP 07-160411 A 6/1995
JP 3218716 B2 8/2001
JP 2002-169645 A 6/2002
JP 3582433 B2 8/2004
JP 2004-334642 11/2004

* cited by examiner

*Primary Examiner*—Khoi Tran
*Assistant Examiner*—Dale Moyer
(74) *Attorney, Agent, or Firm*—Wolf, Greenfield & Sacks, P.C.

(57) ABSTRACT

A process execution apparatus and method is disclosed by which a process can be executed significantly simply and readily. The process execution apparatus includes a direction recognition section for recognizing a housing member shaking direction in which a housing member is shaken, and a process execution section for executing a process in response to the housing member shaking direction recognized by the direction recognition section. The direction recognition section recognizes the housing member shaking direction with respect to a direction of the gravity detected when the housing member is held by a person.

17 Claims, 8 Drawing Sheets

PROCESS EXECUTION APPARATUS, PROCESS EXECUTION METHOD AND PROCESS EXECUTION PROGRAM

CROSS REFERENCES TO RELATED APPLICATIONS

The present invention contains subject matter related to Japanese Patent Application JP 2005-136743 filed with the Japanese Patent Office on May 9, 2005, the entire contents of which being incorporated herein by reference.

BACKGROUND OF THE INVENTION

This invention relates to a process execution apparatus, a process execution method and a process execution program and can be suitably applied to a process execution apparatus which executes a process, for example, in response to a shaking direction of a housing member which is moved by shaking.

A process execution apparatus of the type described is disclosed, for example, in Japanese Patent Laid-open No. 2004-334642 which recognizes in which direction a housing member is shaken as viewed from the housing member and executes a process in response to the recognized housing member shaking direction. For example, if the housing member is shaken in the rightward direction as viewed from the housing member, then the process execution apparatus executes a process corresponding to the rightward direction.

SUMMARY OF THE INVENTION

Incidentally, if a user wants the process execution apparatus having the configuration described above to execute a process corresponding to the rightward direction, but the user holds the housing member in a leftwardly-rightwardly reversed posture, the user must either shake the housing member in the leftward direction to execute the process corresponding to the rightward direction, or re-hold the housing member in a correct leftwardly-rightwardly posture prior to shaking the housing member in the rightwardly direction. As a result, the process execution apparatus has a problem in that a desired process cannot necessarily be executed simply and readily therewith.

There is a need for the present invention to provide a process execution apparatus, a process execution method and a process execution program by which a process can be executed significantly simply and readily.

In order to satisfy the need described above, according to the present invention, there is provided a process execution apparatus including a direction recognition section configured to recognize a housing member shaking direction in which a housing member is shaken, and a process execution section configured to execute a process in response to the housing member shaking direction recognized by the direction recognition section, the direction recognition section recognizing the housing member shaking direction with respect to a direction of the gravity detected when the housing member is held by a person.

In the process execution apparatus, in whichever posture the housing member is held by a user, the housing member shaking direction as viewed from the user who shakes the housing member can be recognized accurately.

More particularly, since the housing member shaking direction with respect to the direction of the gravity detected when the housing member is held by the user is recognized, in whichever posture the housing member is held by the user, the housing member shaking direction as viewed from the user who shakes the housing member can be recognized accurately. As a result, the process execution apparatus can execute a process significantly simply and readily.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENT

1. Configuration of the Music Reproduction Robot Apparatus

Figure 1A:
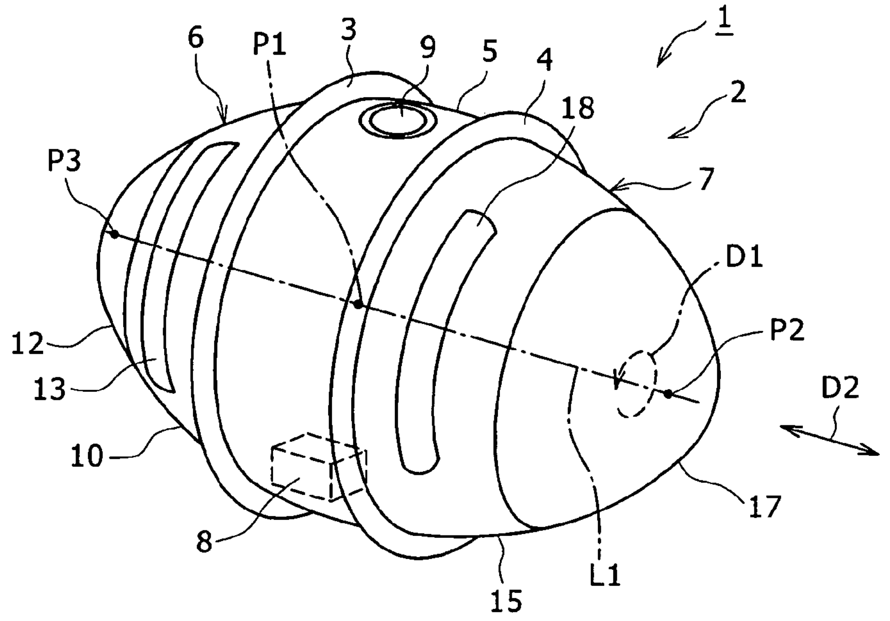
FIGS. 1A and 1B are schematic views showing an appearance of a music reproduction robot apparatus to which the present invention is applied.
Figure 1B:
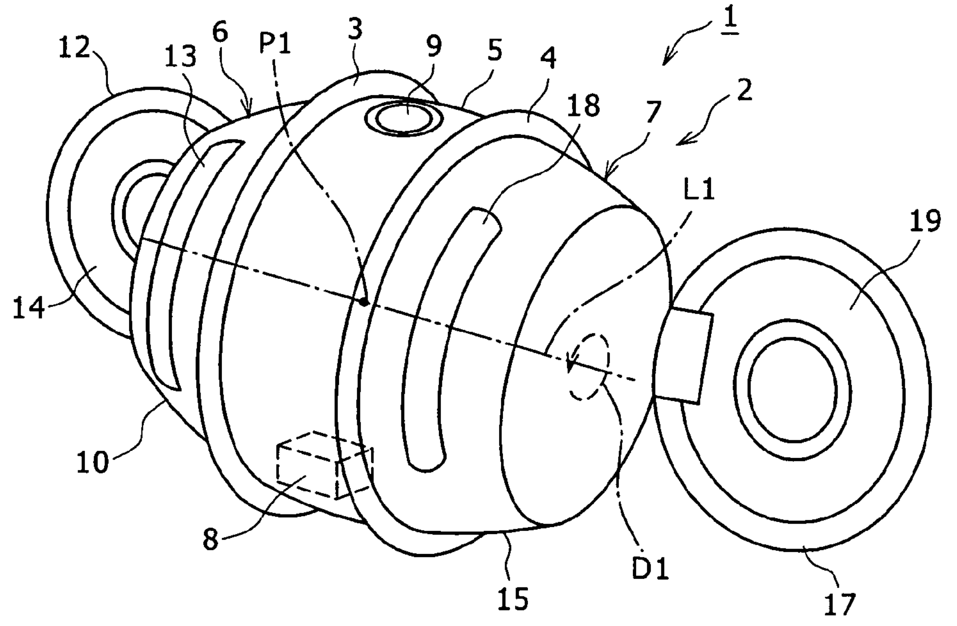

Referring first to FIGS. 1A and 1B, there is shown a music reproduction robot apparatus to which the present invention is applied. The music reproduction robot apparatus 1 includes an ellipsoid housing member 2 having, for example, an ellipsoid shape.

Figure 2:
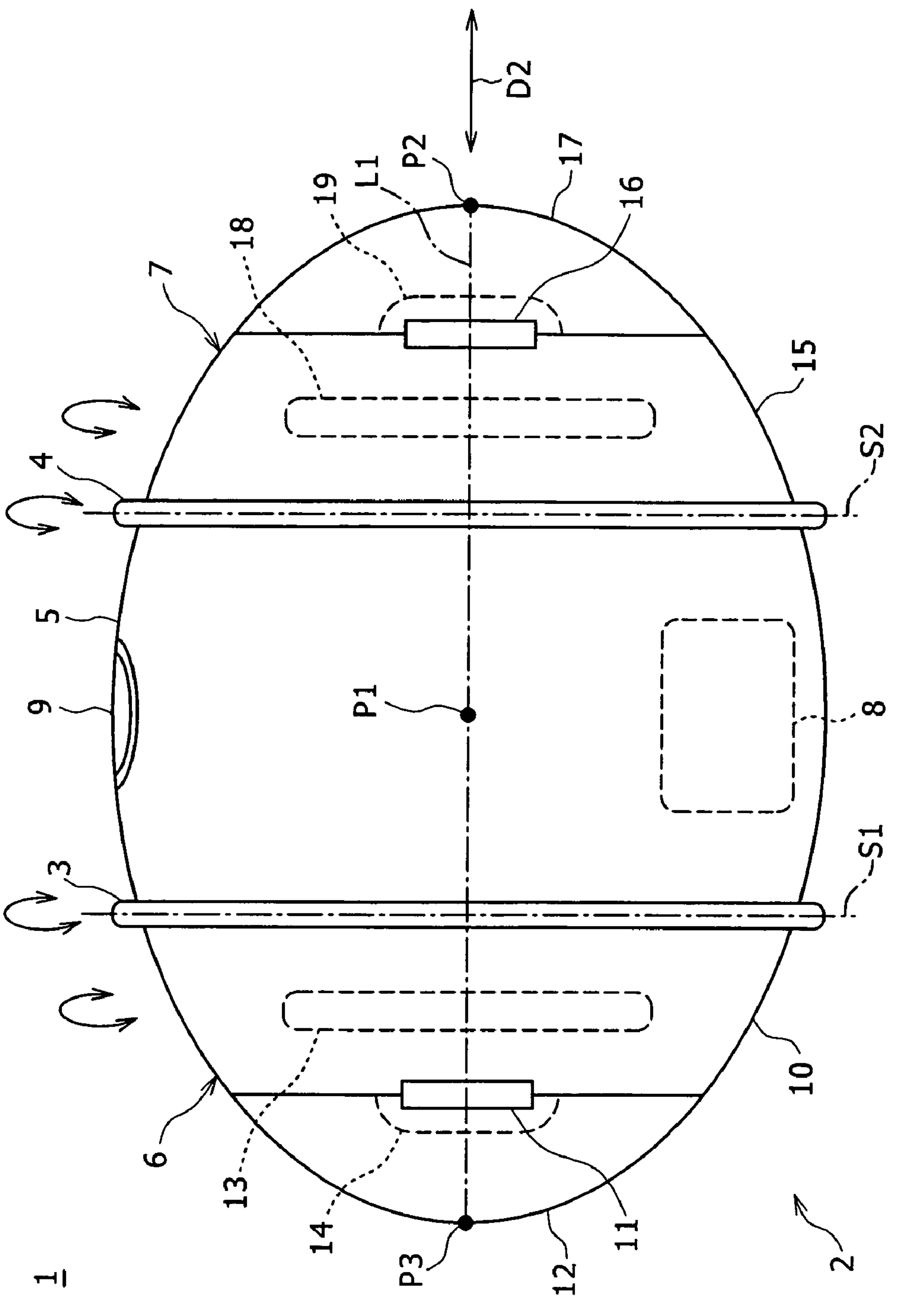
FIG. 2 is a schematic front elevational view showing a configuration of the music reproduction robot apparatus.

Referring also to FIG. 2, the music reproduction robot apparatus 1 includes a left side wheel 3 and a right side wheel 4 formed in a same ring shape on a left side vertical plane S1 and a right side vertical plane S2. The vertical planes S and S2 are positioned at equal distances from a central point P1 of the ellipsoid housing member 2, and extend perpendicularly relative to a horizontal rotational axial line L1 which extends along a straight line from the central point P1 to vertices P2 and P3 on the surface of the ellipsoid housing member 2. The left side wheel 3 and the right side wheel 4 extend along the outer periphery of the ellipsoid housing member 2 and project outwardly from the outer periphery of the ellipsoid housing member 2. The left side wheel 3 and the right side wheel 4 are supported for rotation in a direction D1 around the horizontal rotational axial line L1.

The ellipsoid housing member 2 further includes a central housing member 5 provided between the left side wheel 3 and the right side wheel 4, a left side housing member 6 provided on the left side in FIG. 2 of the central housing member 5 and shaped such that the surface thereof approaches the horizontal rotational axial line L1 (the diametrical dimension decreases) from the central housing member 5 side toward the left end, and a right side housing member 7 provided on the right side in FIG. 2 of the central housing member 5 and shaped such that the surface thereof approaches the horizontal rotational axial line L1 (the diametrical dimension decreases) from the central housing member 5 side toward the right end.

Figure 3:
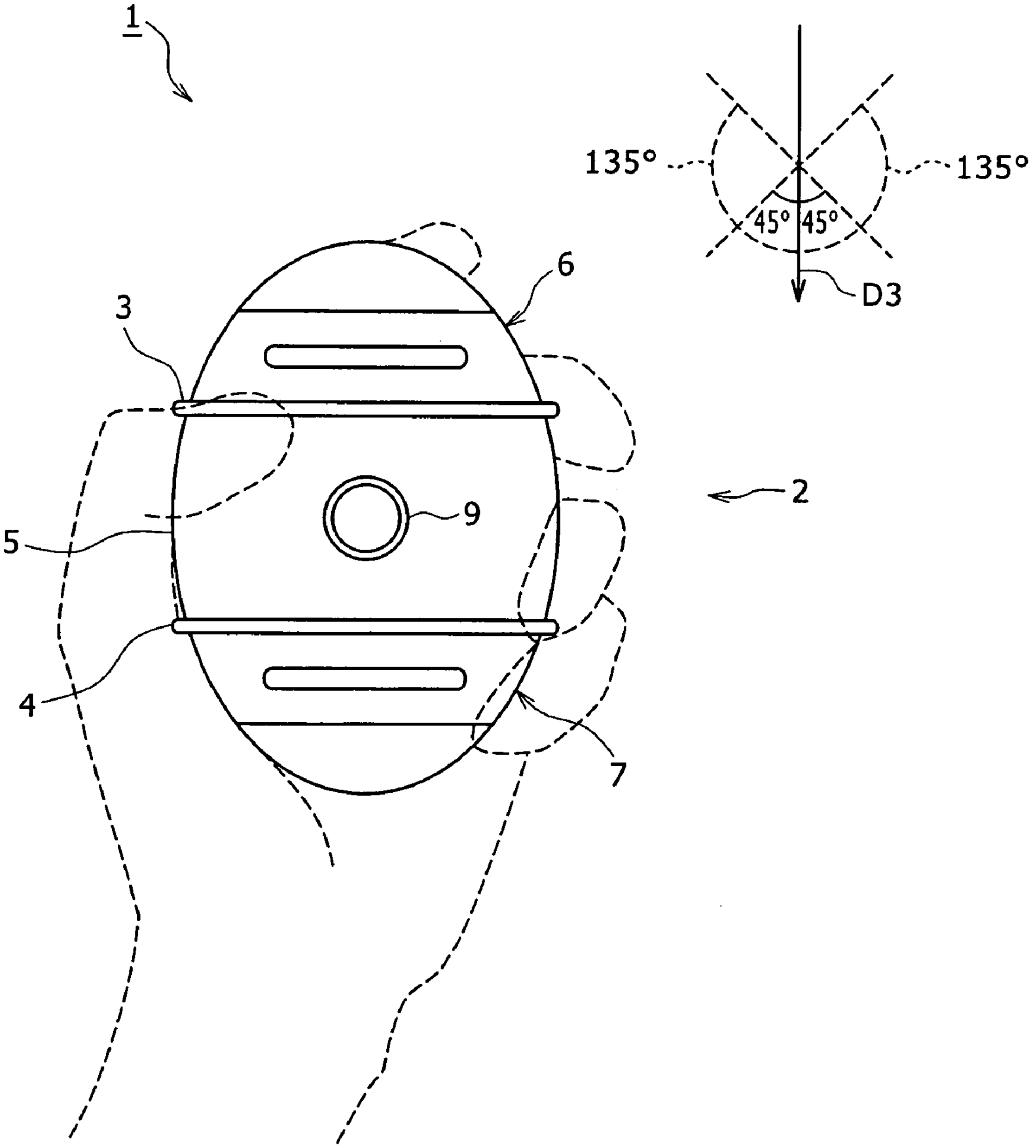
FIG. 3 is a schematic top plan view showing a configuration of the music reproduction robot apparatus.

The central housing member 5 has a weight 8 provided inside a lower portion of the central housing member 5 for controlling the central housing member 5 from rotating in the direction D1 round the horizontal rotational axial line L1. Further, a contact detection sensor section 9 for detecting that the surface of the central housing member 5 is contacted by a finger, a hand or the like as seen also in FIG. 3 is provided on the surface of the central housing member 5. Incidentally, in the present embodiment, the contact detection sensor section 9 detects a finger, a hand or the like which contacts, for example, with a region of the surface of the central housing member 5 which is as large as a fingertip.

Meanwhile, the left side housing member 6 includes a left side rotational member 10 mounted for rotation in the direction D1 around the horizontal rotational axial line L1 with respect to the central housing member 5, and a left side opening and closing member 12 connected to the left side of the left side rotational member 10 by a hinge member 11 such that it can be pivotally opened outwardly in the leftward direction. The left side rotational member 10 has a light emitting element 13 provided on the surface thereof for emitting light. Further, the left side opening and closing member 12 has a speaker 14 provided in the inside thereof such that, when the left side opening and closing member 12 is pivotally opened outwardly in the leftward direction around the hinge member 11, the speaker 14 is exposed to the outside as seen in FIG. 1B.

Similarly, the right side housing member 7 includes a right side rotational member 15 mounted for rotation in the direction D1 around the horizontal rotational axial line L1 with respect to the central housing member 5, and a right side opening and closing member 17 connected to the right side of the right side rotational member 15 by a hinge member 16 such that it can be pivotally opened outwardly in the rightward direction. The right side rotational member 15 has a light emitting element 18 provided on the surface thereof for emitting light. Further, the right side opening and closing member 17 has a speaker 19 provided in the inside thereof such that, when the right side opening and closing member 17 is pivotally opened outwardly in the rightward direction around the hinge member 16, the speaker 19 is exposed to the outside as seen in FIG. 1B.

Figure 4:
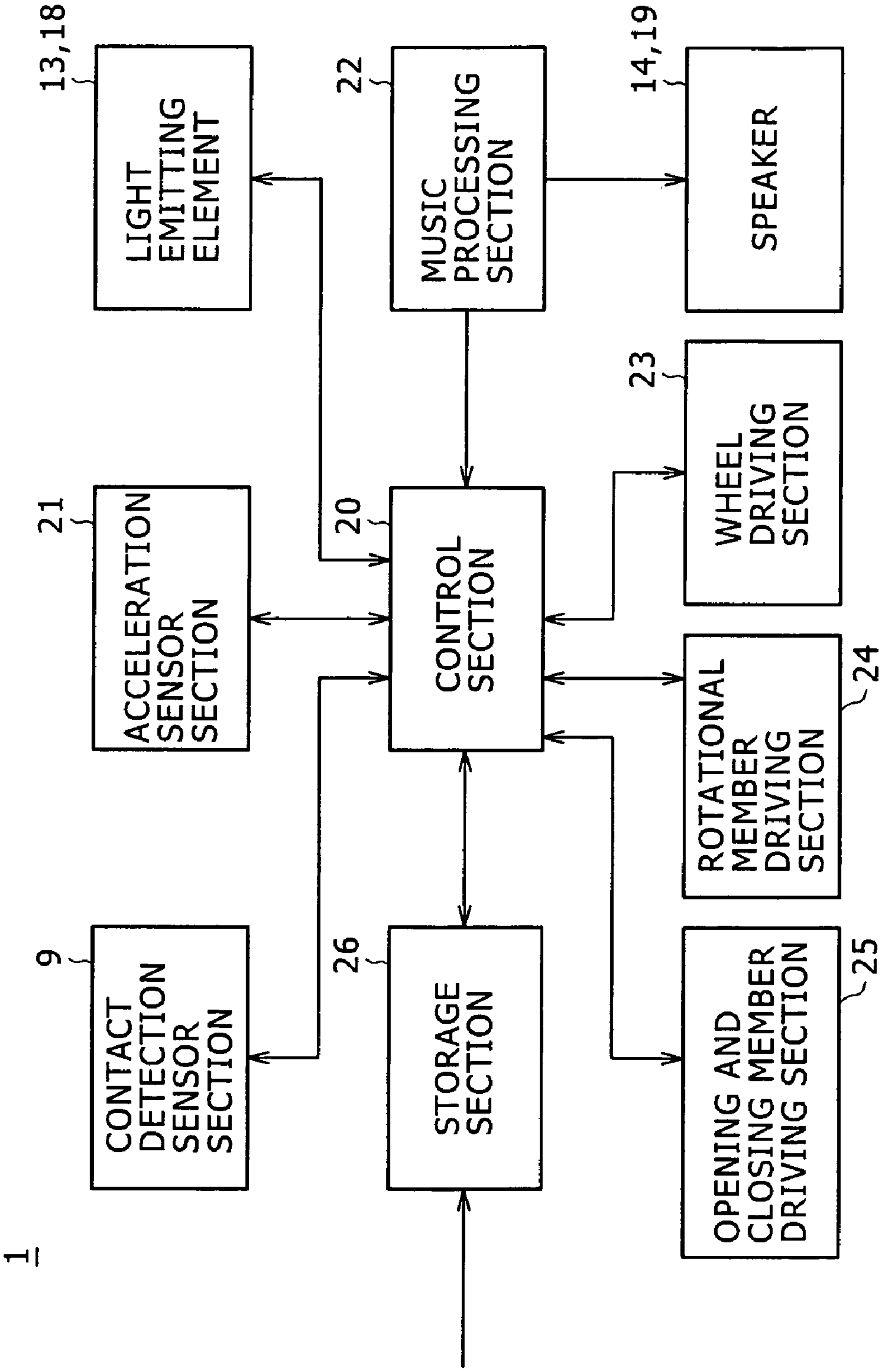
FIG. 4 is a block diagram showing a circuit configuration of the music reproduction robot apparatus.

Referring now to FIG. 4, there is shown an internal circuit configuration of the ellipsoid housing member 2. The music reproduction robot apparatus 1 includes a control section 20 for controlling the entire music reproduction robot apparatus 1 and an acceleration sensor section 21. The control section 20 detects through the acceleration sensor section 21 that the ellipsoid housing member 2 is lifted from the floor or the like by a hand of a user.

After the control section 20 detects that the ellipsoid housing member 2 is lifted from the floor or the like by a hand of a user, the control section 20 detects if a finger, a hand, or the like of the user is in contact with the contact detection sensor section 9 provided on the surface of the central housing member 5. The control section 20 then detects through the acceleration sensor section 21 if the ellipsoid housing member 2 is shaken at an acceleration higher than a predetermined value, and if this condition is met, the control section 20 executes a shaking direction process for detecting the housing shaking direction in which the ellipsoid housing member 2 is shaken.

For example, if the control section 20 recognizes through the acceleration sensor section 21 in the shaking direction decision process that the housing shaking direction is a direction representative of an instruction to reproduce music, then the control section 20 decides that a reproduction control instruction to reproduce music is inputted.

The control section 20 reads out music data stored in a storage section 26 in accordance with the reproduction control instruction and outputs music based on the read out music data successively through a music processing section 22 and the speakers 14 and 19. In this manner, the music reproduction robot apparatus 1 can execute the music reproduction process of outputting music from the speakers 14 and 19 based on the music data stored in the storage section 26.

Then, if the control section 20 detects through the acceleration sensor section 21 that the ellipsoid housing member 2 is placed on the floor in such a manner that both of the left side wheel 3 and the right side wheel 4 contact with the floor, then the control section 20 executes a reproduction tune operation process of causing the pertaining sections of the ellipsoid housing member 2 to move in response to a tune (tempo, interval and so forth) of the music being currently reproduced.

In particular, in the reproduction tune operation process, the control section 20 controls a wheel driving section 23 in accordance with the tune of the music being currently reproduced to drive the left side wheel 3 and the right side wheel 4 to rotate in the direction D1 around the horizontal rotational axial line L1. Consequently, the music reproduction robot apparatus 1 can travel stably on the floor or the like in a synchronized relationship with the tune of the music being outputted from the speakers 14 and 19.

Further, in the reproduction tune operation process, the control section 20 controls a rotational member driving section 24 in response to the tune of the music being currently reproduced to drive the left side rotational member 10 and the right side rotational member 15 to rotate. Consequently, the left side housing member 6 and the right side housing member 7 are rotated in the direction D1 around the horizontal rotational axial line L1. As a result, the left side housing member 6 and the right side housing member 7 can be rotated in synchronism with the tune of the music being currently outputted from the speakers 14 and 19 in such a manner that the traveling of the music reproduction robot apparatus 1 by the left side wheel 3 and the right side wheel 4 may not be disturbed.

Furthermore, in the reproduction tune operation process, the control section 20 controls an opening and closing member driving section 25 in response to the tune of the music being currently reproduced to move the left side opening and closing member 12 and the right side opening and closing member 17 to open outwardly to the left side and the right side, respectively. Consequently, the music reproduction robot apparatus 1 can open and close the left side opening and closing member 12 and the right side opening and closing member 17 in synchronism with the tune of the music being currently outputted from the speakers 14 and 19.

Further, in the reproduction tune operation process, the control section 20 controls the light emitting elements 13 and 18 to emit light in response to the tune of the music being currently reproduced. Consequently, the music reproduction robot apparatus 1 can emit light in synchronism with the tune of the music being currently outputted from the speakers 14 and 19.

Thus, the music reproduction robot apparatus 1 can operate in such a manner that it dances on the floor or the like in response to the tune of the music being outputted from the speakers 14 and 19, and as a result, the entertainment performance can be enhanced significantly.

2. Music Reproduction Control Processing Procedure

Figure 5:
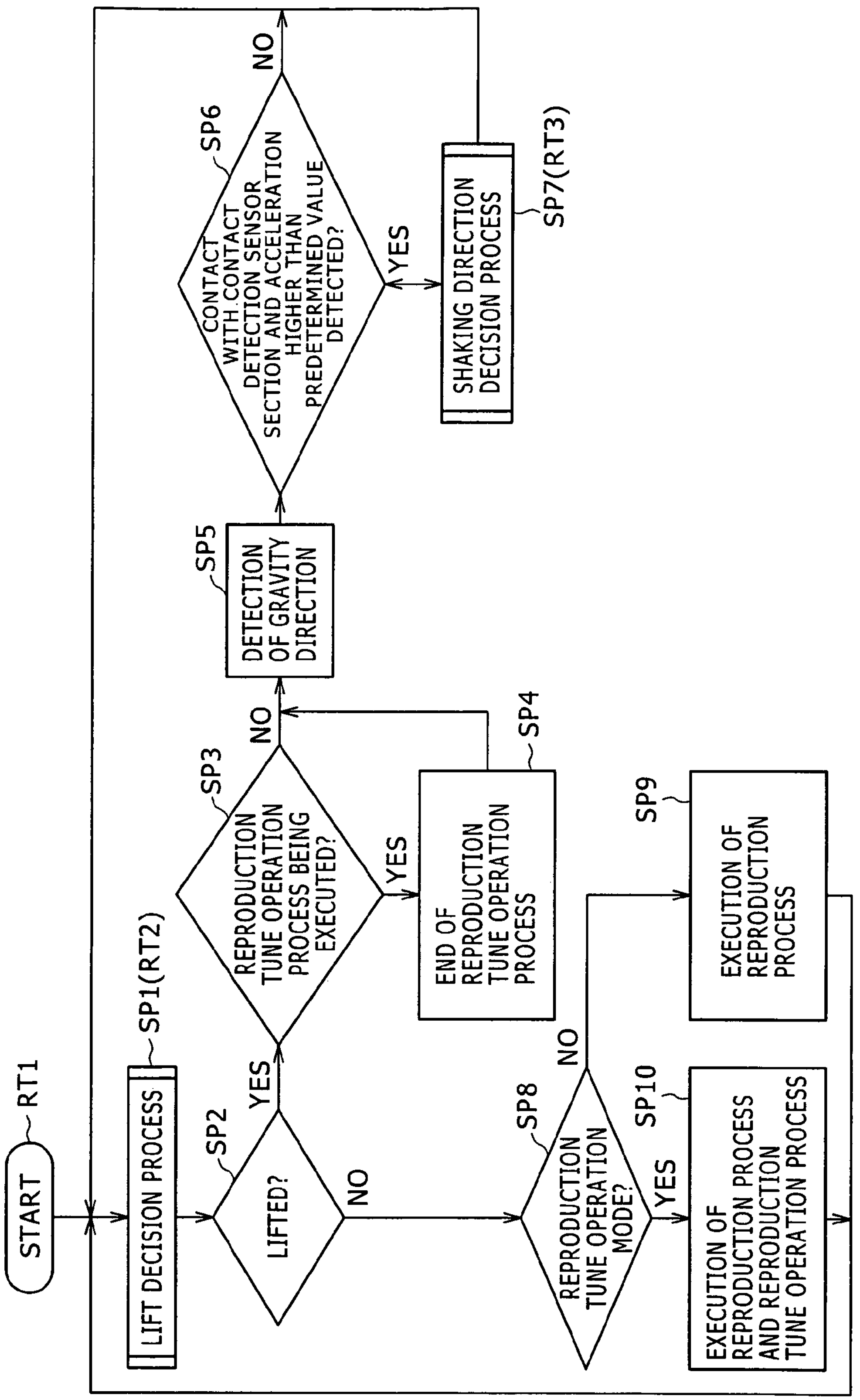
FIG. 5 is a flow chart illustrating a music reproduction control processing procedure of the music reproduction robot apparatus.

Now, a music reproduction control processing procedure RT1 of controlling music reproduction in response to the housing shaking direction of the ellipsoid housing member 2 is described particularly with reference to a flow chart shown in FIG. 5.

After the power supply to the music reproduction robot apparatus 1 is turned on, the control section 20 of the music reproduction robot apparatus 1 advances the processing to step SP1, at which it executes a lift decision process of deciding whether or not the ellipsoid housing member 2 is lifted from the floor.

Then, if the control section 20 recognizes as a result of the lift decision process that the ellipsoid housing member 2 is lifted from the floor, then the control section 20 obtains an affirmative result at step SP2 and then advances the processing to step SP3.

At step SP3, the control section 20 decides whether or not the reproduction tune operation process is being currently executed. If a negative result is obtained at step SP3, then this signifies that the wheels 3 and 4, rotational members 10 and 15, opening and closing members 12 and 17 and so forth remain in an inoperative state, and at this time, the control section 20 advances the processing to step SP5.

On the other hand, if an affirmative result is obtained at step SP3, then this signifies that the wheels 3 and 4, rotational members 10 and 15, opening and closing members 12 and 17 and so forth are in an operative state. At this time, the control section 20 advances the processing to step SP4, at which it ends the reproduction tune operation process. Thereafter, the control section 20 advances the processing to step SP5. Consequently, when the music reproduction robot apparatus 1 is lifted by the user, the operation of the wheels 3 and 4, rotational members 10 and 15, opening and closing members 12 and 17 and so forth can be stopped.

Then at step SP5, the control section 20 detects the direction of the gravity applied to the ellipsoid housing member 2 by means of the acceleration sensor section 21, and then advances the processing to step SP6.

In this manner, the control section 20 detects the direction in which gravity acts on the ellipsoid housing member 2 when the ellipsoid housing member 2 is lifted.

If the control section 20 detects, at step SP6, through the contact detection sensor section 9 that the contact detection sensor section 9 is contacted by a hand, a finger or the like of the user and further detects through the acceleration sensor section 21 that the ellipsoid housing member 2 is shaken at an acceleration higher than a predetermined value, then the control section 20 decides that a reproduction control instruction is inputted by the user shaking the ellipsoid housing member 2, and advances the processing to step SP7, at which the control section 20 executes the shaking direction decision process. Incidentally, if it is not decided at step SP6 that the contact detection sensor section 9 is contacted by a hand, a finger or the like of the user or that the ellipsoid housing member 2 is shaken at an acceleration higher than the predetermined value, then the processing returns to step SP1. If it is detected that the ellipsoid housing member 2 is shaken while the contact detection sensor section 9 is not contacted by a hand, a finger or the like of the user, then the control section 20 decides that the user does not intend a shaking operation of the ellipsoid housing member 2. In other words, when the ellipsoid housing member 2 is shaken by an impact from the outside (for example, the ellipsoid housing member 2 is shaken in a bag), since this shaking movement is not an input by the user, the control section 20 decides that the shaking movement is noise and does not perform such operation as reproduction. Consequently, wrong operation of the ellipsoid housing member 2 can be prevented.

In the shaking direction decision process at step SP7, the control section 20 recognizes, through the acceleration sensor section 21, the housing member shaking direction of the ellipsoid housing member 2 with respect to the gravity direction detected at step SP5 by the acceleration sensor section 21. If the control section 20 decides that the recognized housing member shaking direction signifies, for example, an instruction to reproduce music, then it decides that a reproduction control instruction to reproduce music is inputted, and returns the processing to step SP1.

Consequently, the control section 20 executes the lift decision process for deciding whether or not the ellipsoid housing member 2 is lifted from the floor at step SP1 again. Then, if a negative result is obtained at step SP2 next to step SP1, then this signifies that the ellipsoid housing member 2 is placed on the floor in such a manner that both of the left side wheel 3 and the right side wheel 4 contact with the floor. At this time, the control section 20 advances the processing to step SP8.

At step SP8, the control section 20 decides whether or not a mode set in advance is a reproduction tune operation mode in which the reproduction tune operation process should be executed. If a negative result is obtained at step SP8, then this signifies that the music reproduction robot apparatus 1 is not in the reproduction tune operation mode. At this time, the control section 20 advances the processing to step SP9, at which the control section 20 starts execution only of a music reproduction process of reproducing music based on the music data stored in the storage section 26. Thereafter, the control section 20 returns the processing to step SP1.

On the other hand, if an affirmative result is obtained at step SP8, then this signifies that the music reproduction robot apparatus 1 is set to the reproduction tune operation mode. At this time, the control section 20 advances the processing to step SP10, at which execution of the music reproduction process and the reproduction tune operation process of causing the pertaining sections of the ellipsoid housing member 2 to operate in response to the tune of the music being currently produced is started. Thereafter, the control section 20 returns the processing to step SP1.

Figure 6:
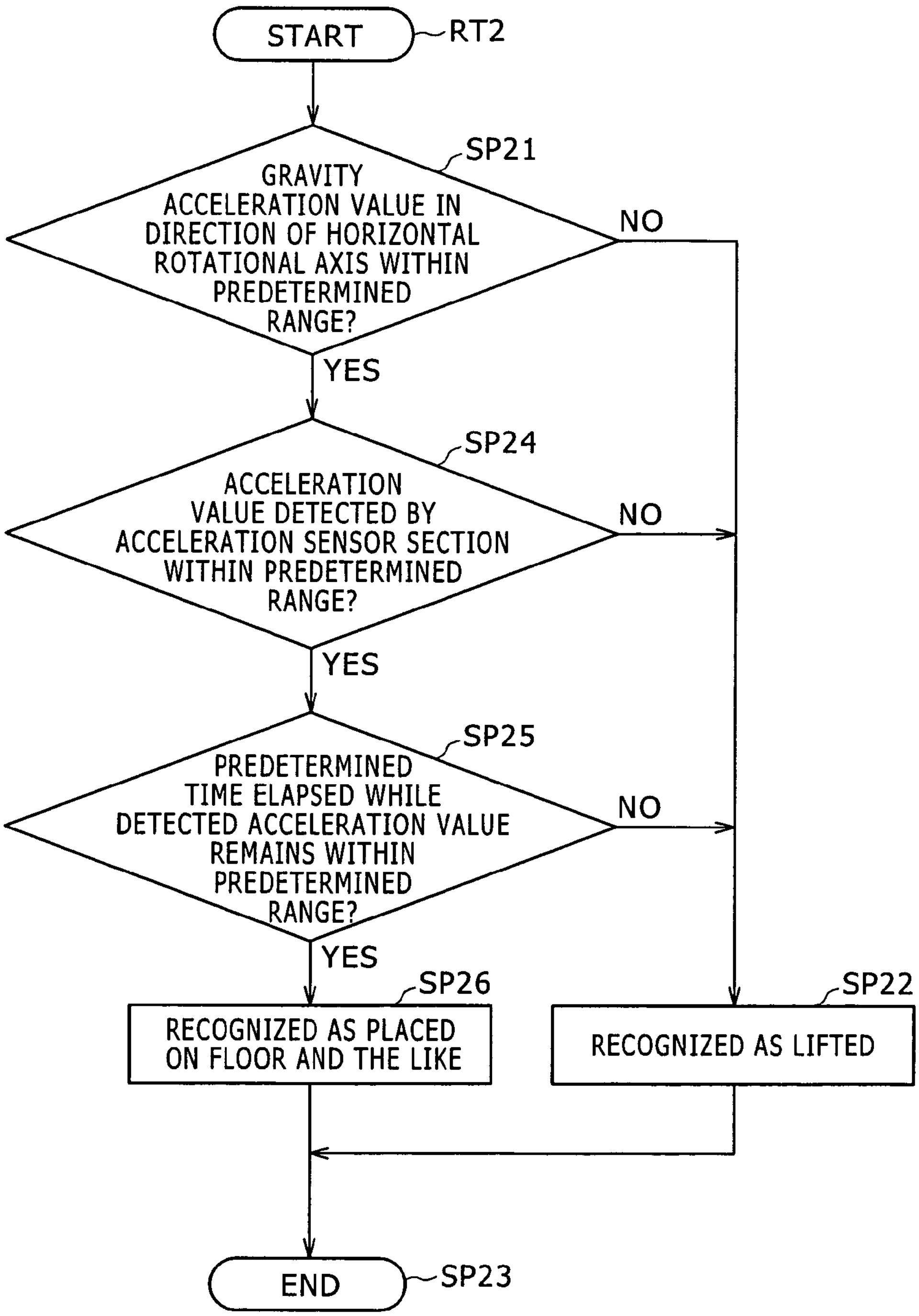
FIG. 6 is a flow chart illustrating a lift decision processing procedure of the music reproduction robot apparatus.

Now, the lift decision processing procedure RT2 which is executed at step SP1 of the music reproduction control processing procedure RT1 is described particularly with reference to a flow chart of FIG. 6.

At step SP21, the control section 20 of the music reproduction robot apparatus 1 detects a gravity acceleration value of the ellipsoid housing member 2 in the horizontal rotational axial direction D2 through the acceleration sensor section 21 and decides whether or not the detected gravity acceleration value is within a predetermined range. Incidentally, in the present embodiment, the gravity acceleration corresponds to an acceleration caused by the gravity acting upon the ellipsoid housing member 2.

If a negative result is obtained at step SP21, then this signifies that the posture of the ellipsoid housing member 2 is inclined because the gravity acceleration in the horizontal rotational axial direction D2 exhibits a variation. At this time, the control section 20 decides that the music reproduction robot apparatus 1 is not in a posture that both of the left side wheel 3 and the right side wheel 4 remain in contact with the floor, and advances the processing to step SP22. At step SP22, the control section 20 recognizes that the ellipsoid housing member 2 is lifted, and thereafter, the processing advances to an end step SP23, at which the control section 20 ends the lift decision processing procedure RT2.

On the other hand, if an affirmative result is obtained at step SP21, then this signifies that the posture of the ellipsoid housing member 2 is not in an inclined state. At this time, the control section 20 advances the processing to step SP24.

At step SP24, the control section 20 detects an acceleration value including a different direction by means of the acceleration sensor section 21 and decides whether or not the detected acceleration value is within a predetermined range. Incidentally, the acceleration in this instance in the present embodiment corresponds to an acceleration caused by an external force acting upon the ellipsoid housing member 2.

If a negative result is obtained at step SP24, then this signifies that the ellipsoid housing member 2 is somewhat moving in some direction. At this time, the control section 20 decides that the movement of the ellipsoid housing member 2 in this instance is caused, for example, by hand shaking of the user, and advances the processing to step SP22. At step SP22, the control section 20 decides that the ellipsoid housing member 2 is lifted. Thereafter, the control section 20 advances the processing to the end step SP23, at which the control section 20 ends the lift decision processing procedure RT2.

On the other hand, if an affirmative result is obtained at step SP24, then this signifies that the ellipsoid housing member 2 is not substantially moving in any direction. At this time, the control section 20 advances the processing to step SP25.

At step SP25, the control section 20 decides whether or not a predetermined interval of time (for example, several seconds) elapses while the detected acceleration value remains within the predetermined range.

If a negative result is obtained at step SP25, then this signifies that the ellipsoid housing member 2 is moving in some direction within the predetermined period of time. At this time, the control section 20 decides that the movement of the ellipsoid housing member 2 at this time is caused, for example, by hand shaking of the user. Thereafter, the control section 20 advances the processing to step SP22, at which it recognizes that the ellipsoid housing member 2 is lifted. Thereafter, the control section 20 advances the processing to the end step SP23, at which it ends the lift decision processing procedure RT2.

On the other hand, if an affirmative result is obtained at step SP25, then this signifies that the ellipsoid housing member 2 does not substantially move in any direction within the predetermined period of time. Accordingly, at this time, the control section 20 advances the processing to step SP26, at which it recognizes that the ellipsoid housing member 2 is placed on a flat place such as the floor in such a manner that both of the left side wheel 3 and the right side wheel 4 contact with the flat place. Thereafter, the control section 20 advances the processing to the end step SP23, at which it ends the lift decision processing procedure RT2.

Figure 7:
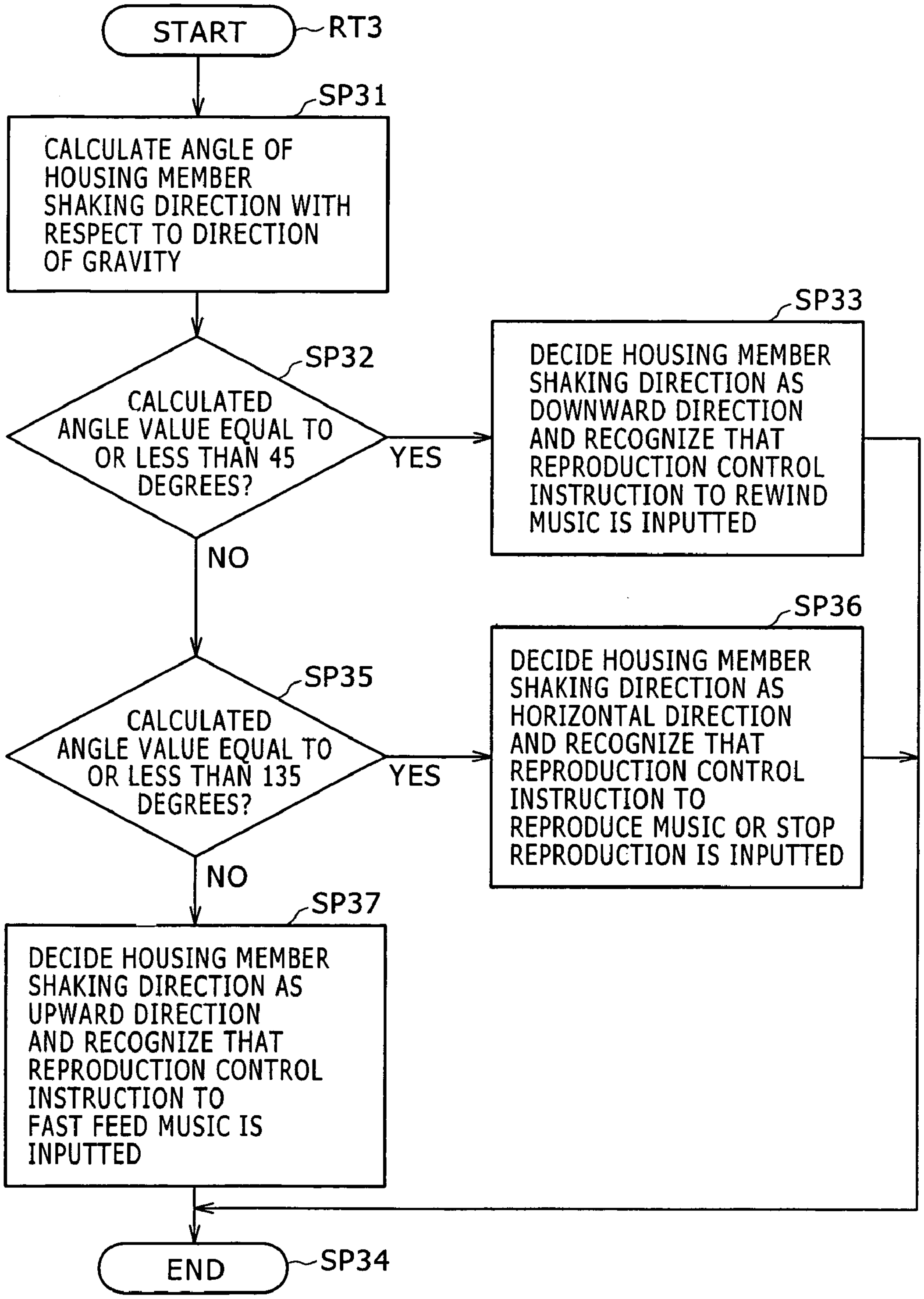
FIG. 7 is a flow chart illustrating a shaking direction decision processing procedure of the music reproduction robot apparatus.

Now, the shaking direction decision processing procedure RT3 executed at step SP7 of the music reproduction control processing procedure RT1 is described particularly with reference to flow charts shown in FIGS. 3 and 7.

At step SP31, the control section 20 of the music reproduction robot apparatus 1 calculates the deviation angle of the housing member shaking direction in with respect to the gravity direction D3 detected at step SP5 described hereinabove.

Then at step SP32, the control section 20 decides whether or not the angle calculated at step SP31 is equal to or lower than 45°. If an affirmative result is obtained at step SP32, then this signifies that the ellipsoid housing member 2 held by the user is shaken in a substantially downward direction as viewed from the user. At this time, the control section 20 advances the processing to step SP33, at which it decides that the housing member shaking direction is the downward direction. As a result, the control section 20 recognizes that, for example, a reproduction control instruction to rewind music is inputted, and advances the processing to the ending step SP34, at which the control section 20 ends the shaking direction decision process. Thereafter, the control section 20 executes a music reproduction control process, for example, of rewinding the music being currently reproduced.

On the other hand, if a negative result is obtained at step SP32, then this signifies that the ellipsoid housing member 2 held by the user is shaken in a direction other than the downward direction as viewed from the user. At this time, the control section 20 advances the processing to step SP35, at which it decides whether or not the angle calculated at step SP31 is equal to or smaller than 135°.

If an affirmative result is obtained at step SP35, then this signifies that the ellipsoid housing member 2 held by the user is shaken in a substantially horizontal direction as viewed from the user. At this time, the control section 20 advances the processing to step SP36, at which it decides that the housing member shaking direction is the horizontal direction. As a result, the control section 20 recognizes that a reproduction control instruction, for example, to reproduce or stop music is inputted, and advances the processing to the ending step SP34, at which it ends the shaking direction decision process. Thus, the control section 20 executes a music reproduction control process, for example, of starting music reproduction or stopping music reproduction.

On the other hand, if a negative result is obtained at step SP35, then this signifies that the ellipsoid housing member 2 held by the user is shaken substantially upwardly as viewed from the user. At this time, the control section 20 advances the processing to step SP37, at which it decides that the housing member shaking direction is the upward direction. As a result, the control section 20 recognizes that, for example, a reproduction control instruction to fast feed the music is inputted, and advances the processing to the ending step SP34, at which the shaking direction decision process is ended. Thus, the control section 20 thereafter executes a music reproduction control process, for example, of fast feeding music being currently reproduced.

3. Operation and Effects

The music reproduction robot apparatus 1 having the configuration described above recognizes the housing member shaking direction in which the ellipsoid housing member 2 is shaken and executes a music reproduction control process (music reproduction, stopping of music reproduction, rewinding of music, fast feeding of music or the like) in response to the recognized housing member shaking direction.

Here, the music reproduction robot apparatus 1 detects the gravity direction D3 in which the gravity acts when the ellipsoid housing member 2 is lifted, and recognizes the housing member shaking direction with respect to the detected gravity direction D3.

Consequently, in whichever posture the ellipsoid housing member 2 is held by the user, the music reproduction robot apparatus 1 can accurately recognize the housing member shaking direction as viewed from the user in which the ellipsoid housing member 2 is shaken.

As a result, even if the user shakes, the ellipsoid housing member 2 without taking the posture of the ellipsoid housing member 2 into consideration, the music reproduction robot apparatus 1 can execute a music reproduction control process in response to the direction in which the ellipsoid housing member 2 is shaken. Consequently, the music reproduction robot apparatus 1 can execute a music reproduction control process very simply and easily.

With the music reproduction robot apparatus 1 having the configuration described above, since it detects, when the ellipsoid housing member 2 is lifted, the gravity direction D3 and recognizes the housing member shaking direction with respect to the detected gravity direction D3, when the ellipsoid housing member is lifted, and in whichever posture the ellipsoid housing member 2 is held by the user, the music reproduction robot apparatus 1 can accurately recognize the housing member shaking direction as viewed from the user in which the ellipsoid housing member 2 is shaken. As a result, the music reproduction robot apparatus 1 can execute a music reproduction control process very simply and readily.

Further, in the present embodiment, the storage section 26 of the music reproduction robot apparatus 1 stores tempo information (BMP (Beat Per Minute)) representative of the tempo of the music corresponding to music data. Then, the control section 20 of the music reproduction robot apparatus 1 recognizes, through the acceleration sensor section 21, the number of times by which the acceleration sensor section 21 is shaken in the housing member shaking direction representative of an instruction to reproduce music within a predetermined period of time (for example, several seconds). The control section 20 reads out music data coordinated with tempo information corresponding to the recognized number of times from the storage section 26 and performs a reproduction process of the music data. Consequently, if the music reproduction robot apparatus 1 is shaken fast in the housing member shaking direction representative of an instruction to reproduce music, then the music reproduction robot apparatus 1 reproduces music data having a high tempo in response to the shaking operation. However, if the music reproduction robot apparatus 1 is shaken slowly in the housing member shaking direction representative of an instruction to reproduce music, then the music reproduction robot apparatus 1 can reproduce music data having a low tempo.

Alternatively, the music reproduction robot apparatus 1 in the present embodiment may perform shuffle reproduction wherein the music data stored in the storage section 26 of the music reproduction robot apparatus 1 are reproduced arbitrarily in accordance with an instruction by a housing member shaking operation. At this time, if the music reproduction robot apparatus 1 is shaken fast in a housing member shaking direction representative of an instruction to reproduce music while the speed of the shaking operation of the user is coordinated with tempo information of music, then shuffle reproduction of an object of reproduction of music data having a high tempo corresponding to the shaking is performed. On the other hand, if the music reproduction robot apparatus 1 is shaken slowly in a housing member shaking direction representative of an instruction to reproduce music, then shuffle reproduction of an object reproduction of music data having a low tempo corresponding to the shaking is performed.

Further, in the present embodiment, if, for example, a reproduction control instruction to reproduce music is inputted by shaking of the ellipsoid housing member 2, then the control section 20 of the music reproduction robot apparatus 1 executes a notification process for notifying the user that a reproduction control instruction to reproduce music is accepted in response to the input. In the notification process, the control section 20 energizes the light emitting elements 13 and 18 to be lit in accordance with the accepted reproduction control information and outputs music according to the accepted reproduction control instruction through the music processing section 22 and the speakers 14 and 19. Consequently, the user can confirm the reproduction control instruction inputted by the shaking of the ellipsoid housing member 2.

4. Other Embodiments

Figure 8A:
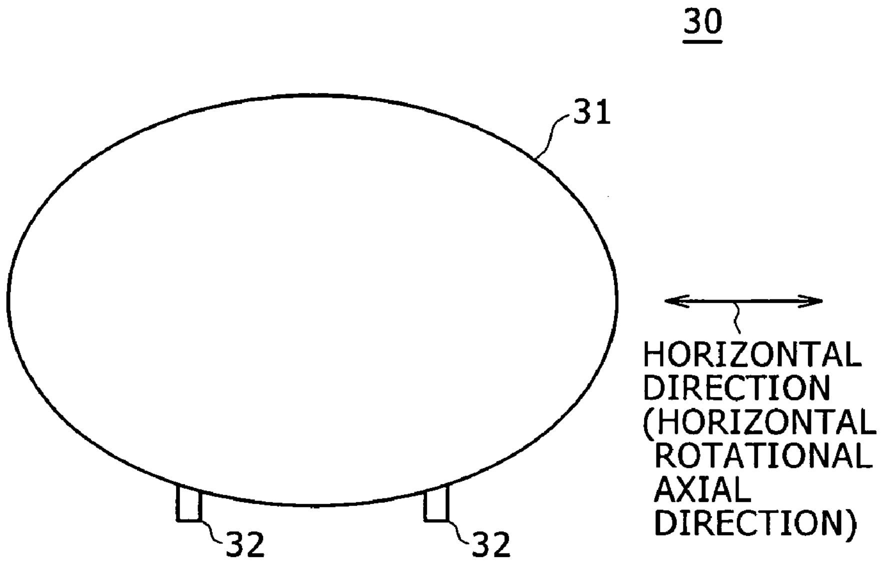
FIGS. 8A and 8B are a schematic view and a block diagram showing an appearance and a circuit configuration of a process execution apparatus to which the present invention is applied, respectively.
Figure 8B:
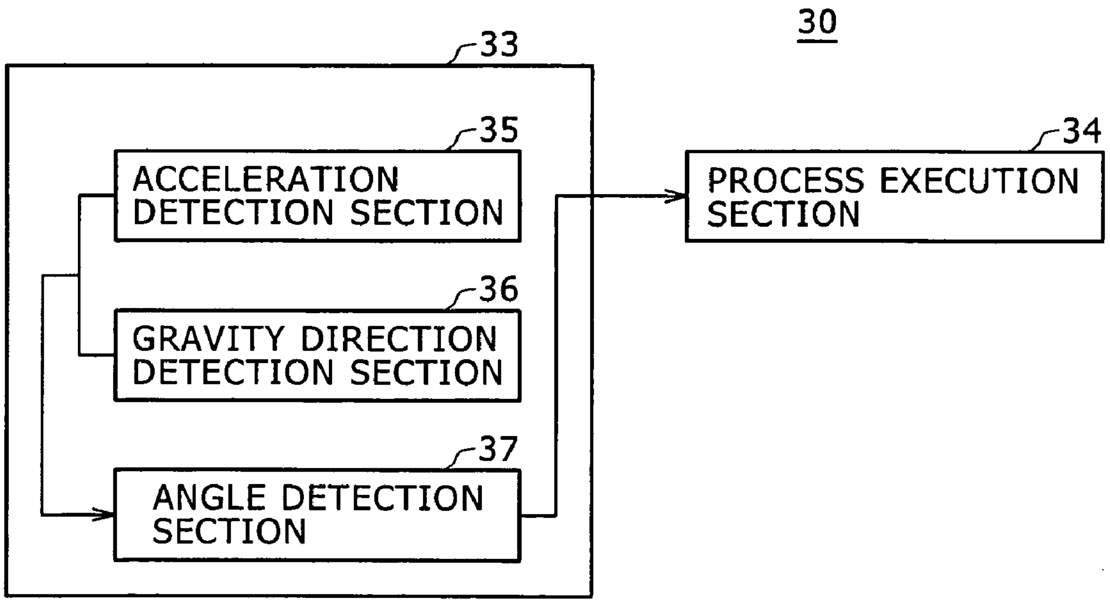

In the embodiment described above, the music reproduction robot apparatus 1 which executes a music reproduction control process in response to a housing shaking direction, may be implemented, for example, as such a process execution apparatus 30 which executes a process in response a housing shaking direction as shown in FIGS. 8A and 8B. However, the present invention is not limited to this, but can be applied to an apparatus which executes an image reproduction control process in response to a housing shaking direction, a remote controller for remotely inputting a control instruction to an electronic apparatus and other various apparatus.

Further, in the embodiment described above, the ellipsoid housing member 2 is in the form of an ellipsoid, for example, as housing member 31, which is shaken by a user as shown in FIG. 8A. However, the present invention is not limited to this, but can be applied to housings of various shapes such as, for example, a cylindrical shape or a cubic shape.

Further, in the embodiment described above, the left side wheel 3 and the right side wheel 4 may compromise a supporting section 32 for supporting the housing member 31 as shown in FIG. 8A. However, the present invention is not limited to this but can be applied to a pedestal or any other structure only if it contacts with the floor, ground or the like and supports the housing member 31 when the housing member 31 is placed on the floor, ground or the like.

Further, in the embodiment described above, the acceleration sensor section 21 and the control section 20, may comprise, for example a direction recognition section 33 for recognizing the tubular member shaking direction in which the housing is shaken as shown in FIG. 8B. However, the present invention is not limited to this but can be applied to various structures.

Further, in the embodiment described above, the control section 20 which executes a music reproduction control process and the music processing section 22 are applied, for example, as such a process execution section 34 which executes a process in response to the housing member shaking direction recognized by the direction recognition section 33 as shown in FIG. 8B. However, the present invention is not limited to this, but can be applied to various processing execution sections which execute an image reproduction control process of controlling image reproduction of image data, a process of inputting a sentence and various other processes.

Further, in the embodiment described above, the acceleration sensor section 21 which corresponds to a three-axis acceleration sensor or the like which can detect three-dimensional accelerations, may comprise, for example, an acceleration detection section 35 for detecting an acceleration value applied to the housing member 31 and a gravity direction detection section 36 for detecting the direction of the gravity acting upon the housing member 31 when the acceleration value detected by the gravity direction detection section 36 is higher than a predetermined value as shown in FIG. 8B. Further, the control section 20 may comprise, for example, an angle detection section 37 for detecting the angle of the housing member shaking direction with respect to the direction of the gravity detected by the gravity direction detection section 36 as shown in FIG. 8B. However, the present invention is not limited to this but can be applied to various other configurations.

Furthermore, in the embodiment described above, a semiconductor memory is applied as the storage section 26 for storing music data supplied from an external apparatus such as, for example, a personal computer. However, the present invention is not limited to this but can be applied to various recording media such as a CD (Compact Disk), an MD (Mini Disk) and a hard disk driver.

Further, in the embodiment described above, the control section 20 executes the music reproduction control processing procedure RT1, lift decision processing procedure RT2 and shaking direction decision processing procedure RT3 according to software in accordance with a program installed in the music reproduction robot apparatus 1. However, the present invention is not limited to this, but a circuit for executing the music reproduction control processing procedure RT1, lift decision processing procedure RT2 and shaking direction decision processing procedure RT3 may be provided in the music reproduction robot apparatus 1 such that the processing procedures RT1 to RT3 are executed by hardware. Further, a program for executing the music reproduction control processing procedure RT1, lift decision processing procedure RT2 and shaking direction decision processing procedure RT3 may be recorded in or on a recording medium such as a CD.

The present invention can be applied to music reproduction robot apparatus and so forth which execute a music reproduction control process, for example, in response to a housing member shaking direction in which a housing member is shaken.

While a preferred embodiment of the present invention has been described using specific terms, such description is for illustrative purposes only, and it is to be understood that changes and variations may be made without departing from the spirit or scope of the following claims.

What is claimed is:

1. A process execution apparatus, comprising:

a direction recognition section comprising at least one acceleration sensor and configured to recognize a housing member shaking direction in which a housing member is shaken by a user;

a storage section comprising at least one predetermined instruction associated with the housing member shaking direction; and a process execution section configured to reproduce music data stored in said storage section in response to the housing member shaking direction recognized by said direction recognition section by executing the at least one predetermined instruction associated with the housing member shaking direction; and control a movement of at least one moveable portion of the process execution apparatus in accordance with at least one characteristic of the reproduced music data; and;

wherein said direction recognition section recognizes the housing member shaking direction with respect to a direction of gravity detected by the at least one acceleration sensor.

2. The process execution apparatus according to claim 1, wherein said direction recognition section comprises:

an acceleration detection section configured to detect an acceleration value applied to said housing member, a gravity direction detection section configured to detect the direction of gravity acting upon said housing member when the acceleration value detected by said acceleration detection section is outside a predetermined range, and an angle detection section configured to detect an angle of the housing member shaking direction with respect to the direction of the gravity detected by said gravity direction detection section, wherein said process execution section reproduces the music data in response to the angle detected by said angle detection section.

3. The process execution apparatus according to claim 2, further comprising:

a supporting section configured to support said housing member, wherein said acceleration detection section detects a gravity acceleration value in a rotational axial direction defined as a direction parallel to a surface when said housing member is supported on said surface through said supporting section, and wherein said gravity direction detection section detects the direction of the gravity acting upon said housing member when the gravity acceleration value in the rotational axial direction detected by said acceleration detection section is outside a predetermined range.

4. The process execution apparatus according to claim 3, wherein said supporting section comprises at least two wheel structures.

5. The process execution apparatus according to claim 1, further comprising a contact detection section configured to detect a contacting operation of the user with said contact detection section from outside, said process execution section configured to prevent execution of the process unless input from the user is detected by said contact detection section.

6. The process execution apparatus according to claim 1, further comprising a contact detection section configured to detect a contacting operation of a user with said contact detection section from outside, said processing execution section executing the process when an input from the user is detected by said contact detection section.

7. The process execution apparatus according to claim 1, wherein said process execution section executes a reproduction control process of image data stored in said storage section.

8. A process execution method for a process execution apparatus, the method comprising the steps of:

detecting a direction of gravity acting on a housing member of said process execution apparatus while said housing member is held by a user;

recognizing a housing member shaking direction in which said housing member is shaken by the user with respect to the direction of gravity;

executing a reproduction control process of music data in response to the housing member shaking direction, by executing at least one predetermined instruction associated with the housing member shaking direction; and controlling a movement of at least one movable portion of the process execution apparatus in accordance with at least one characteristic of the reproduced music data.

9. The process execution method according to claim 8, wherein recognizing said housing member shaking direction comprises the steps of:

detecting an acceleration value applied to said housing member;

detecting the direction of gravity acting upon said housing member when the detected acceleration value is outside a predetermined range; and calculating an angle of the housing member shaking direction with respect to the direction of gravity, and wherein the process execution step executes the process in response to the calculated angle.

10. The process execution method according to claim 9, wherein:

detecting the acceleration value comprises detecting a gravity acceleration value in a rotational axial direction defined as a direction parallel to a surface when said housing member is supported on said surface through a supporting section, and detecting the direction of gravity comprises detecting the direction of the gravity acting upon said housing member when the gravity acceleration value in the rotational axial direction detected at the acceleration detection step is outside a predetermined range.

11. The process execution method according to claim 8, further comprising the step of detecting a contacting operation of a user with said process execution apparatus from outside, the process execution step preventing execution of the process unless input from the user is detected by the contact detection step.

12. The process execution method according to claim 8, further comprising the step of detecting a contacting operation of a user with said process execution apparatus from outside, the process execution step executing the process when an input from the user is detected by the contact detection step.

13. The process execution method according to claim 8, wherein recognizing a housing member shaking direction comprises detecting a number of times that said process execution apparatus is shaken by the user within a predetermined amount of time, and wherein executing a process comprises selecting said music data for reproduction based on the detected number of times that said process execution apparatus is shaken.

14. A recording medium on or in which a process execution program to be executed by a computer is recorded, the process execution program comprising the steps of:

detecting a direction of gravity acting on a housing member of a process execution apparatus while said housing member is held by a user;

recognizing a housing member shaking direction in which said housing member is shaken by the user with respect to the direction of gravity;

executing a reproduction control process of music data in response to the housing member shaking direction, by executing at least one predetermined instruction associated with the housing member shaking direction; and controlling a movement of at least one moveable portion of the process execution apparatus in accordance with at least one characteristic of the reproduced music data.

15. The process execution method according to claim 13, wherein the detected number of times that said process execution apparatus is shaken corresponds to a desired tempo of said music data selected for reproduction.

16. A process execution apparatus, comprising:

a direction recognition section comprising at least one acceleration sensor and configured to recognize a housing member shaking direction in which a housing member is shaken by a user;

a storage section comprising at least one predetermined instruction associated with the housing member shaking direction; and a process execution section configured to: execute a reproduction control process of music data in response to the housing member shaking direction recognized by said direction recognition section by executing the at least one predetermined instruction associated with the housing member shaking direction; and control a movement of at least one movable portion of the process execution apparatus in accordance with at least one characteristic of the reproduced music data; and wherein said direction recognition section recognizes the housing member shaking direction with respect to a direction of gravity detected by the at least one acceleration sensor.

17. The process execution apparatus according to claim 16, wherein said direction recognition section comprises:

an acceleration detection section configured to detect an acceleration value applied to said housing member, a gravity direction detection section configured to detect the direction of the gravity acting upon said housing member when the acceleration value detected by said acceleration detection section is outside a predetermined range, and an angle detection section configured to detect an angle of the housing member shaking direction with respect to the direction of the gravity detected by said gravity direction detection section, wherein said process execution section executes the process in response to the angle detected by said angle detection section.

* * * * *